United States Patent
Sühring et al.

[11] Patent Number: 5,957,385
[45] Date of Patent: Sep. 28, 1999

[54] SPRAY ARRANGEMENT FOR APPLYING LIQUID TO A VEHICLE WINDOW

[75] Inventors: Axel Sühring, Wolfsburg; Horst Erkens, Gifhorn, both of Germany

[73] Assignee: Volkswagen AG, Wolfsburg, Germany

[21] Appl. No.: 08/946,398

[22] Filed: Oct. 7, 1997

[30] Foreign Application Priority Data

Oct. 9, 1996 [DE] Germany ............... 196 41 4601-14

[51] Int. Cl.⁶ ................................................. B05B 1/10
[52] U.S. Cl. ............... 239/284.1; 239/130; 239/133; 239/587.1; 239/587.5; 239/587.6
[58] Field of Search ..................... 239/284.1, 130, 239/133, 587.1, 587.5, 587.6

[56] References Cited

U.S. PATENT DOCUMENTS

| | | | |
|---|---|---|---|
| 1,733,521 | 10/1929 | Wuesthoff | 239/587.6 |
| 3,973,558 | 8/1976 | Stouffer et al. | 128/66 |
| 4,212,425 | 7/1980 | Schlick | 239/284.1 |

FOREIGN PATENT DOCUMENTS

| | | | |
|---|---|---|---|
| 0724992 | 8/1996 | European Pat. Off. | |
| 1031661 | 6/1958 | Germany | 239/284.1 |
| 1838995 | 7/1961 | Germany | |

*Primary Examiner*—Andres Kashnikow
*Assistant Examiner*—David Deal
*Attorney, Agent, or Firm*—Baker & Botts, L.L.P.

[57] ABSTRACT

A spray arrangement for applying liquid to a window of a motor vehicle includes a spray nozzle having a nozzle body with one or more parts and a nozzle holder with one or more parts, a nozzle insert in the nozzle body through which a cleaning liquid can be sprayed alternately at different angles in one position of the nozzle insert, and an arrangement for adjusting the angle of the nozzle insert with respect to a nozzle installation plane.

6 Claims, 4 Drawing Sheets

SPRAY ARRANGEMENT FOR APPLYING LIQUID TO A VEHICLE WINDOW

BACKGROUND OF THE INVENTION

This invention relates to spray arrangements for applying liquid to a window of a motor vehicle and more particularly, to spray nozzles having a nozzle body and nozzle holder in which the nozzle body has a nozzle insert through which a cleaning liquid can be sprayed alternately at different angles.

Nozzle inserts of this type are described, for example, in U.S. Pat. No. 3,973,558. The nozzle inserts described in that patent specification are elements fixed in position in a nozzle body without any provision for the angle of the spray jet to be adjusted with respect to the window.

In such nozzle inserts, spraying of the cleaning liquid onto the window alternately at different angles is effected by a specific fluid flow mechanism in the nozzle inserts. If the inflow or outflow conditions or the fluid mechanics in the nozzle insert are changed, then the desired oscillating movement of the cleaning liquid spray jet is lost.

Published European Patent Application No. 0 724 992 discloses a spray nozzle having a water channel containing an adjustable spherical nozzle part. The spherical nozzle part makes it possible for the spray direction of the nozzle to be aligned in an optimum fashion with respect to the wiping region of the window wiper after the nozzle body has been mounted in the sheet metal of the automobile hood.

The arrangement of an adjustable spherical part in a nozzle insert, e.g. a fluidic element by which a cleaning liquid can be sprayed onto the window alternately at different angles, or in an outflow channel adjoining the nozzle insert is problematical since the flow mechanism in the nozzle insert is affected by adjustment of the spherical part and the desired oscillating effect of the spray jet flowing out of the nozzle insert is not achieved.

SUMMARY OF THE INVENTION

Accordingly, it is an object of the present invention to provide a spray arrangement for applying liquid to a motor vehicle window which overcomes disadvantages of the prior art.

Another object of the invention is to provide a spray arrangement for applying liquid to a motor vehicle window in which it is possible to set the spray direction of a spray nozzle.

These and other objects of the invention are attained by providing a liquid spray nozzle having a nozzle insert which can be angularly adjusted with respect to an installation plane. For this purpose an adjusting device may be arranged between the nozzle insert and nozzle body, between two parts of the nozzle body, between the nozzle body or a part of the nozzle body and the nozzle holder or a part of the nozzle holder, or between the nozzle holder or a part of the nozzle holder and the vehicle part in which the nozzle is mounted.

This makes it possible to set the spray direction of the spray nozzle without the inflow or outflow conditions or the fluid mechanics in the nozzle insert itself being changed. As a result, the desired flow effect, i.e. the oscillating movement of the spray jet back and forth, is maintained. The point of contact of the fan-like spray jet with the window may thus be adapted specifically to the requirements of the driver.

Because of the narrow channel widths in such nozzle inserts, it is necessary to heat heating the nozzle insert in order to prevent the cleaning liquid from freezing in the channels. Desirably, the heating device is located as close as possible to the nozzle insert, in order to assure good heating while using the smallest possible amount of energy.

The heating device is arranged so that all the flow channels of the nozzle insert, and the inlets and outlets of those channels, do not freeze and that the desired flow effect is thus also produced.

If the angle adjustment device is located between a nozzle insert and a nozzle body, then the minimum distance between the heating device and the nozzle insert is determined by the size of the adjustment device and by the necessary gap for the adjustment path of the nozzle insert. This distance may be reduced further by fixing the nozzle insert and the heating device in the nozzle body, or in a part of the nozzle body.

In this case, the adjustment device is positioned at another part of the nozzle body, the nozzle holder, or the vehicle part containing the nozzle holder, or components thereof.

In order to keep the number of components small, at least a part of the nozzle holder is preferably formed in an integral manner with at least a part of the nozzle body. Such a spray nozzle is mounted, for example, in an aperture in a vehicle part, for example the hood or a body part or an add-on part adjacent to the window.

The axis of rotation around which the nozzle insert can be adjusted with respect to the vehicle part is preferably located in, or parallel to, a linear edge of an aperture in the vehicle part.

In order to prevent the angular position of the nozzle insert from being changed inadvertently, a securing device is provided between the movable parts or between a movable part and a fixed part of the arrangement. This device may be, for example, a self-locking adjustment device such as a screw-connection, a toothed arrangement or an adjustment body having a spiral outer surface.

BRIEF DESCRIPTION OF THE DRAWINGS

Further objects and advantages of the invention will be apparent from a reading of the following descriptions in conjunction with the accompanying drawings, in which.

DESCRIPTION OF PREFERRED EMBODIMENTS

Figure 1:
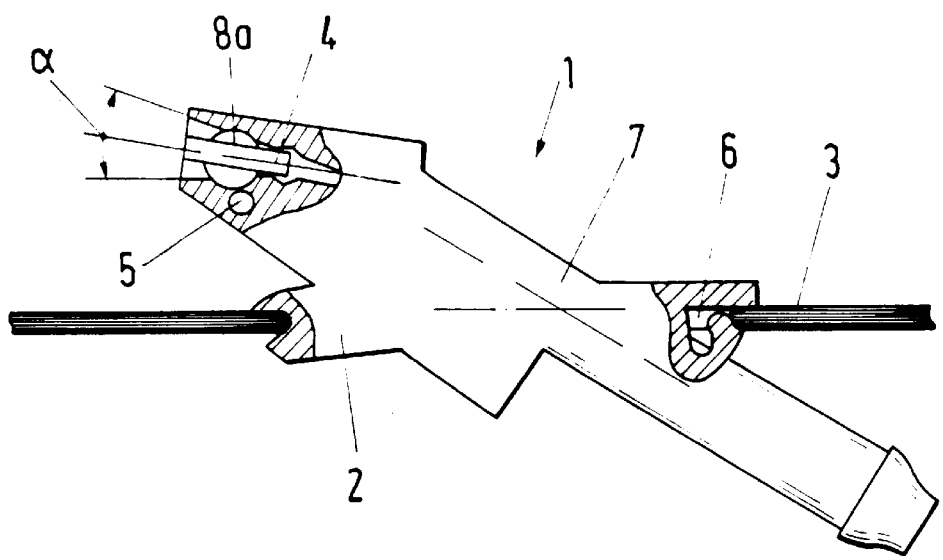
FIG. 1 is a side view, partly in section showing a representative embodiment of an adjustment device between a nozzle insert and a nozzle body in accordance with the invention.
Figure 4:
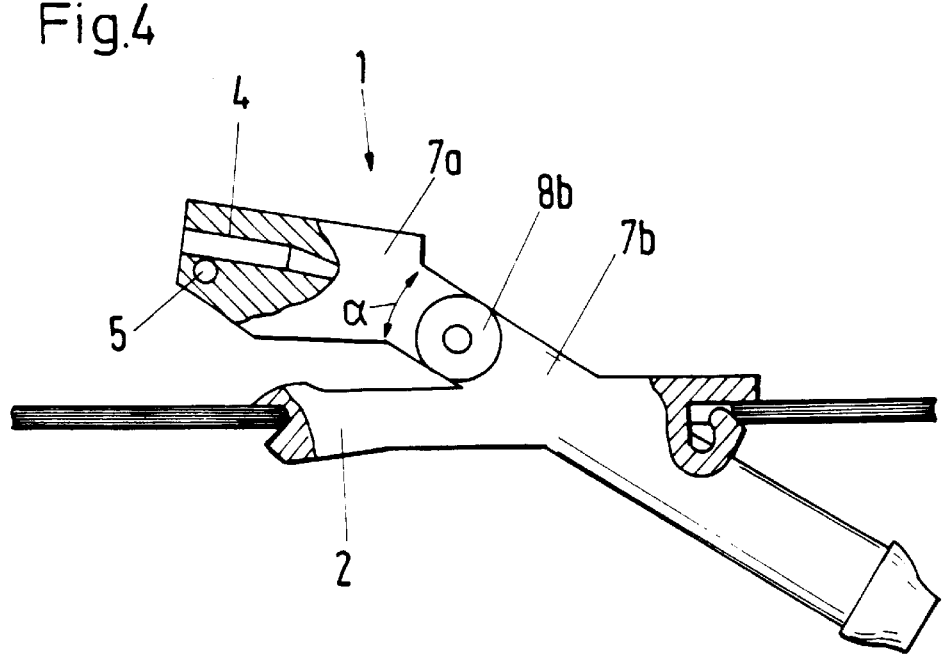
FIG. 4 is a view similar to FIG. 1 showing a spray nozzle with a two-part nozzle body.

In the typical embodiment illustrated in FIG. 1 a spray nozzle 1 has a nozzle body 7 and a nozzle holder 2. The spray nozzle I is retained by the nozzle holder 2 in an aperture 6 in a vehicle part 3. The nozzle holder 2 is fastened in the aperture 6 of the vehicle part 3 by latching or clip elements which are conventional and therefore are not described in any detail.

Figure 2:
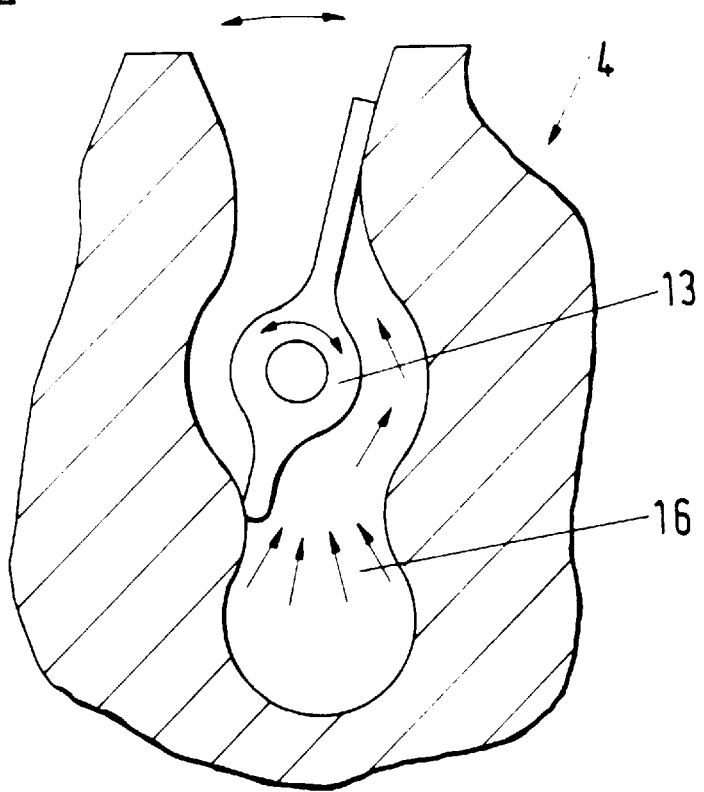
FIG. 2 is an enlarged fragmentary view showing a nozzle insert with an oscillator.
Figure 3:
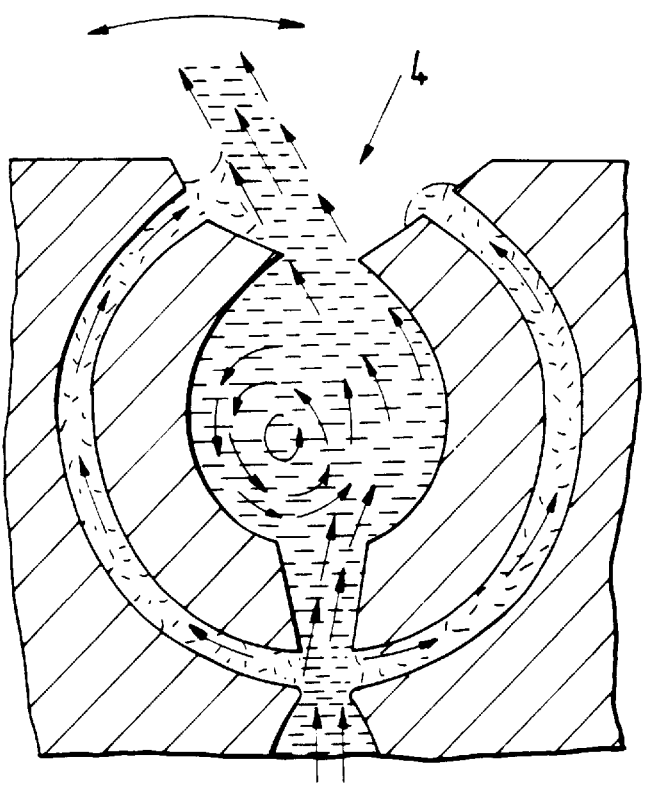
FIG. 3 is an enlarged fragmentary view showing a nozzle insert according U.S. Pat. No. 3,973,558.

FIG. 2 and FIG. 3 show nozzle inserts 4 by which a cleaning liquid can be sprayed onto a window alternately at different angles. In the these arrangements, the spray jet is made to oscillate back and forth here by the flow itself.

The fluid mechanics of the nozzle insert 4 in FIG. 3 are described in U.S. Pat. No. 3,973,558. In this arrangement. if anything at all is changed as regards the inflow or outflow conditions or the flow conditions in the nozzle itself, then the effect of the spray jet oscillating back and forth is not achieved.

In the nozzle insert 4 shown in FIG. 2, an oscillator 13 arranged in the nozzle insert 4 is caused to oscillate by changing forces exerted on the insert by the inflow, which causes the spray jet to oscillate. With this nozzle insert 4 it is also the case that, if the fluid mechanics in the nozzle insert 4 itself are changed, the oscillating movement of the spray jet is not always achieved.

In the arrangement shown in FIG. 1, the nozzle insert 4 has an adjustment device 8a in the nozzle body 7. Using the adjustment device 8a, the orientation of nozzle insert 4 may be adjusted by an adjustment angle α with respect to the nozzle body 7, and thus with respect to the vehicle part 3. Furthermore, in this arrangement a heating device 5 is located as close as possible to the nozzle insert 4. The electric leads to the heating device 5 and the water-supply channel for the nozzle insert 4 are provided in fixed positions in the nozzle body 7.

The embodiment shown in FIG., 4 has a spray nozzle 1 with the two nozzle-body parts 7a and 7b and an angular adjustment device 8b is provided between the two nozzle-body parts 7a and 7b. The nozzle insert 4, with the heating device 5, is fixed in the nozzle-body part 7a. Since the nozzle insert 4 no longer has to be moved in the nozzle-body part 7a, gaps for an adjustment path are not required and the heating device 5 is located closer to the nozzle insert 4. The adjustment device 8b between the two nozzle-body parts 7a and 7b can adjust the direction in which the cleaning liquid is sprayed through the nozzle insert 4 onto the window.

Figure 5A:
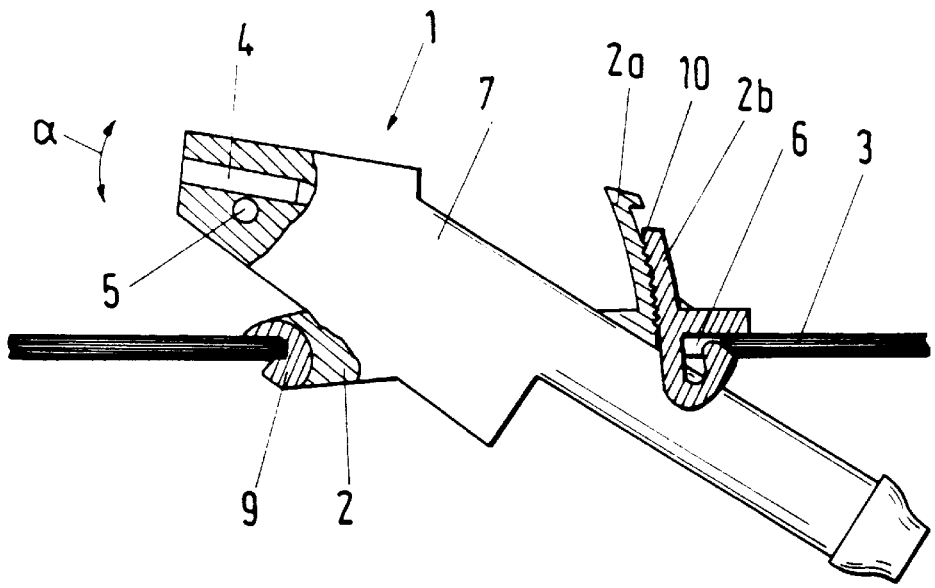
FIGS. 5a to 5d are similar views showing spray nozzles having a two-part nozzle holder.
Figure 5B:
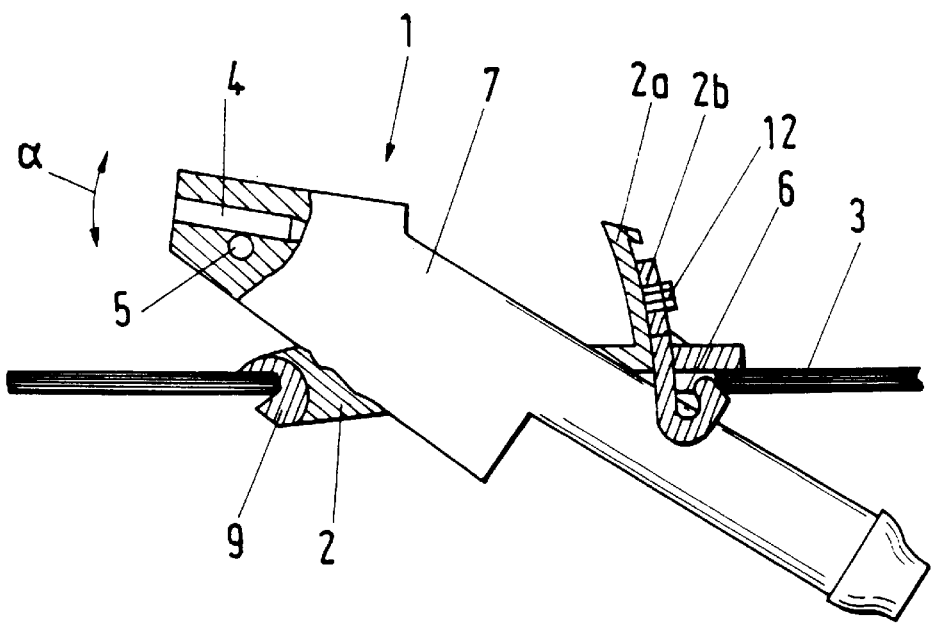

The further embodiments shown in FIGS. 5a, 5b, 5c and 5d have a spray nozzle 1 with a single-part nozzle body 7 and a heating device 5 and nozzle insert 4 fixedly mounted therein. In the embodiments of FIGS. 5a and 5b, the nozzle holder 2 has two parts 2a and 2b. The nozzle-holder part 2a is mounted in a rotationally fixed, preferably integral, manner with respect to the nozzle body 7. An adjustment device is provided between the two nozzle-holder parts 2a and 2b having an axis of rotation located in, or parallel to, an edge 9 of the aperture 6, the edge being linear at least in certain sections. The nozzle body 7 with the nozzle insert 4 is rotatable with the nozzle-holder part 2a by an adjustment angle a in the fixed nozzle-holder part 2b.

In the embodiment of FIG. 5a, a toothed arrangement 10 is provided between the nozzle-holder parts 2a and 2b. The engagement of the toothed arrangement 10 can be released by pushing the nozzle-holder parts 2a and 2b apart. The angle of the nozzle-holder part 2a, with the nozzle body 7, may then be adjusted with respect to the vehicle part 3, in the nozzle-holder part 2b. After the adjustment of the nozzle-holder part 2a, the teeth of the toothed arrangement 10 are again engaged to retain the nozzle-holder part 2a with the nozzle body 7 in position. For this purpose, the portion of one of the nozzle-holder parts 2a or 2b having the toothed arrangement 10 is expediently designed in a resiliently movable manner.

A different securing arrangement is provided in the embodiment of FIG. 5b. In this case, a slot is formed in at least one of the nozzle-holder parts 2a and 2b and a screw-connection 12 is arranged in the slot. The screw can be screwed either into a nut or directly into one of the two nozzle-holder parts 2a and 2b. Once the nozzle-holder parts 2a and 2b have been angularly set with respect to each other, the nozzle-holder parts 2a and 2b are fixed in position by tightening the screw-connection 12.

Figure 5C:
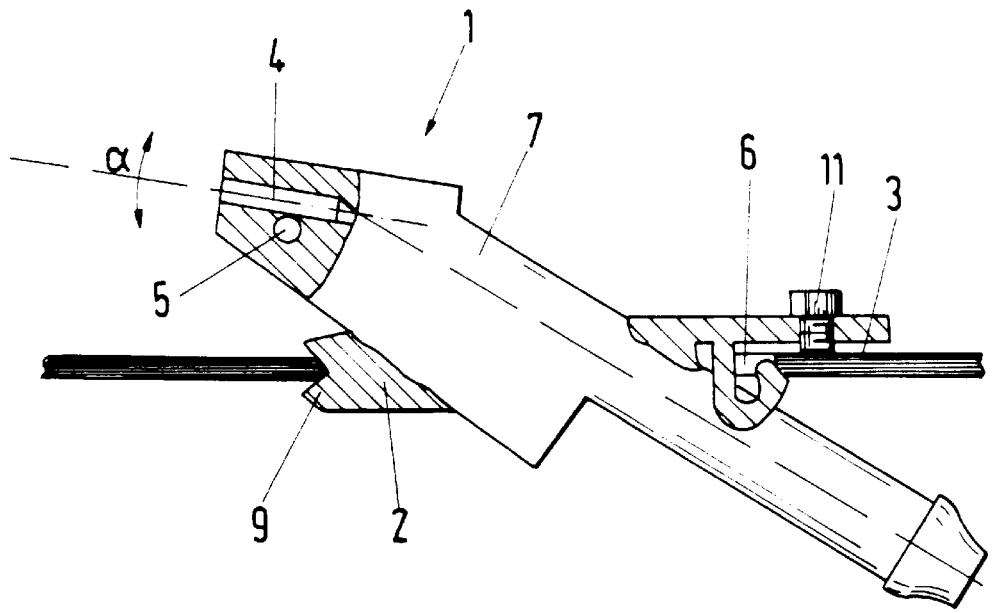
Figure 5D:
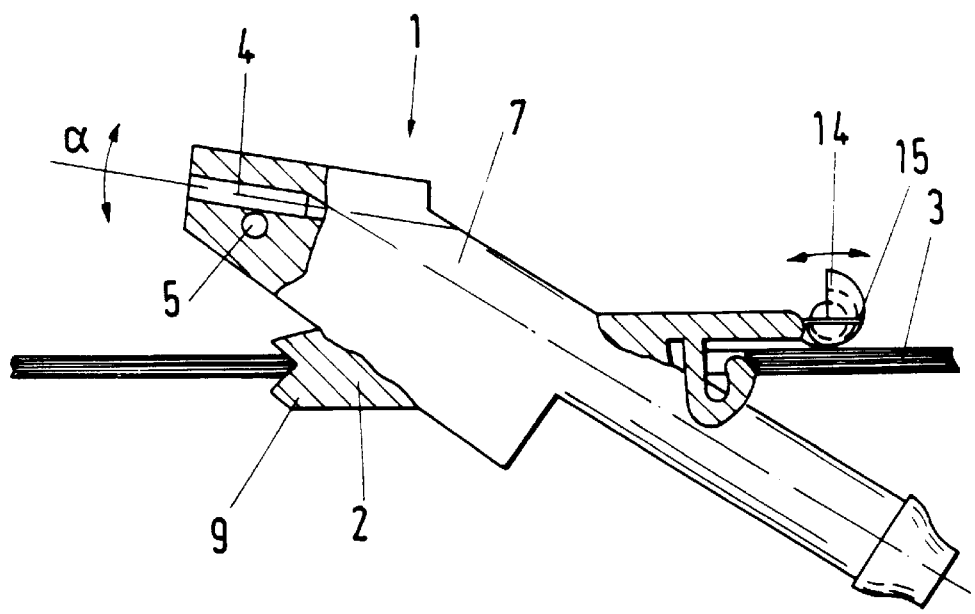

In the embodiments of FIGS. 5c and 5d, the nozzle body 7 is mounted in a rotationally fixed, preferably integral, manner in the nozzle holder 2. The adjustment of the nozzle body 7 and the nozzle holder 2 with respect to the vehicle part 3 can be effected either by a screw 11, as shown in FIG. 5c, or by an adjustment body 14, as shown in FIG. 5d, acting against the force of a retaining element which holds the nozzle body 7 in the aperture 6.

When the screw 11 in FIG. 5c is turned, the nozzle body 7, with the nozzle holder 2, is angularly adjusted with respect to the vehicle part 3 around an axis of rotation located in, or parallel to, the edge 9. The self-locking action of the screw 11 against the nozzle body retaining element causes the nozzle body and the nozzle holder to be retained in position.

In FIG. 5d, an adjustment body 14 has mounted on the nozzle holder 2 a spiral peripheral surface 15. The adjustment body 14 engages the fixed vehicle part 3 by way of the spiral peripheral surface 15. Rotation of the adjustment body 14 changes the spacing of the axis of rotation of the adjustment body with respect to the vehicle part 3, and the nozzle holder 2, with the nozzle body 7, is thus angle-adjusted with respect to the vehicle part 3. The contact pressure of the surface 15 on the vehicle part, resulting from the force exerted by the retaining element of the nozzle holder 2 on the adjustment body 14, prevents said adjustment body 14 from being rotated out of position.

Although the invention has been described herein with reference to specific embodiments, many modifications and variations therein will readily occur to those skilled in the art. Accordingly, all such variations and modifications are included within the intended scope of the invention.

We claim:

1. A spray arrangement for applying liquid to a window of a motor vehicle comprising:

a spray nozzle having a nozzle body including an angularly adjustable nozzle body part and a nozzle holder;

a nozzle insert in the angularly adjustable nozzle body part through which a cleaning liquid can be sprayed alternately at different angles in one position of the nozzle insert;

adjusting means for adjusting the angle of the angularly adjustable nozzle body part with respect to a spray nozzle installation plane; and a heating device in the angularly adjustable nozzle body part located adjacent to and in fixed relation to the nozzle insert therein.

2. A spray arrangement according to claim 1 wherein the angularly adjustable part of the nozzle body containing the nozzle insert can be angularly adjusted around at least one axis with respect to a part of the motor vehicle.

3. A spray arrangement according to claim 1 wherein the nozzle body can be retained by the nozzle holder in an aperture of a part of a motor vehicle.

4. A spray arrangement according to claim 1 for spraying a window of a motor vehicle wherein the spray arrangement is arranged to be fastened on a motor-vehicle part.

5. A spray arrangement according to claim 4 wherein the spray arrangement is arranged to be fastened in an aperture of the motor-vehicle part.

6. A spray arrangement according to claim 5 wherein the angularly adjustable spray nozzle body part can be angularly adjusted through an angle having an axis extending parallel to an edge of the aperture.

* * * * *